Jan. 4, 1955 F. B. CARNEY 2,698,565

DISK HILLER AND DISK SUPPORT

Filed Jan. 10, 1950

INVENTOR
FLETCHER B. CARNEY
BY Toulmin & Toulmin
ATTORNEYS.

United States Patent Office 2,698,565

Patented Jan. 4, 1955

2,698,565

DISK HILLER AND DISK SUPPORT

Fletcher B. Carney, Mountain Brook, Ala.

Application January 10, 1950, Serial No. 137,744

2 Claims. (Cl. 97—56)

Figures 1, 2:
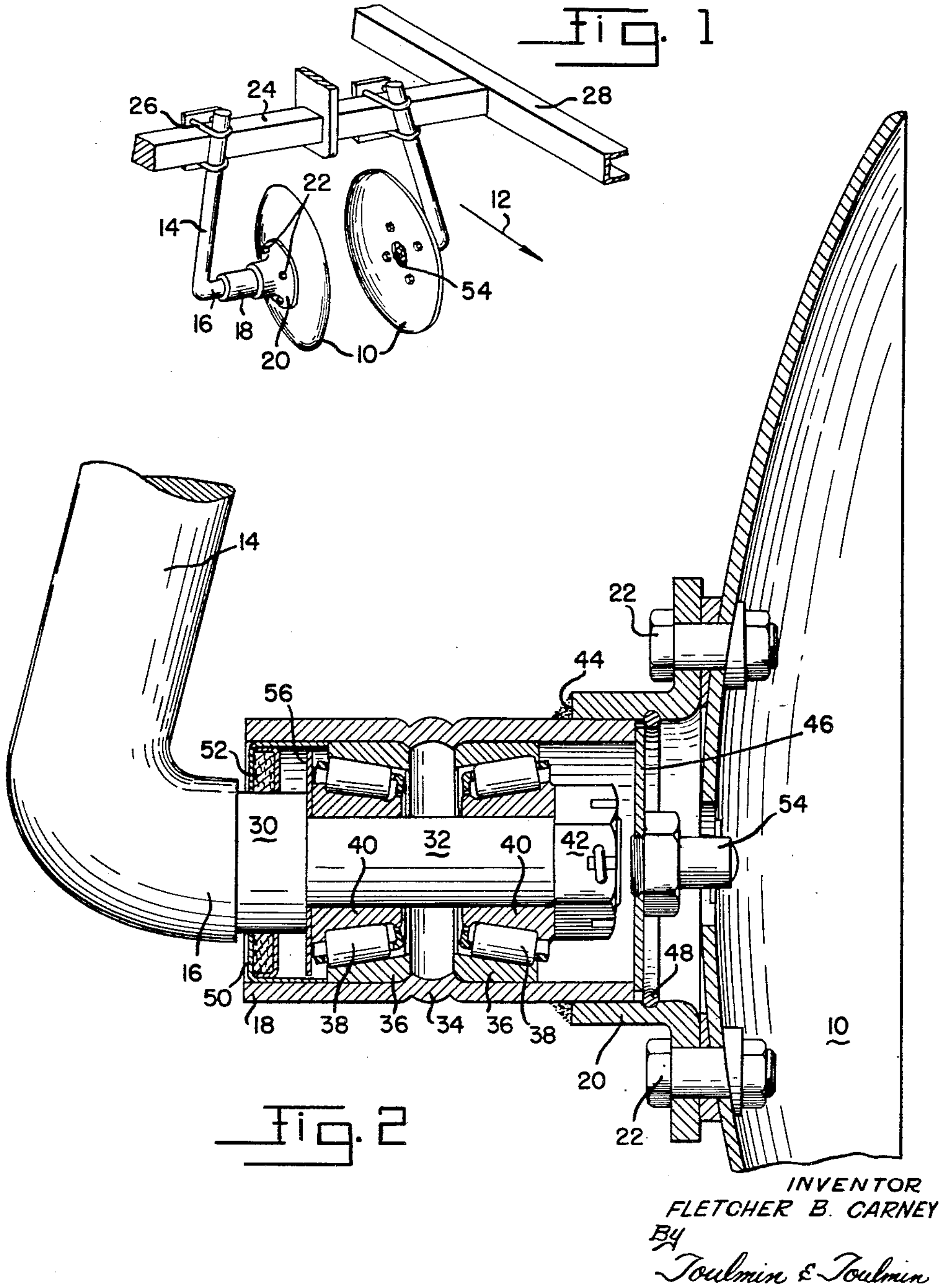

This invention relates to disc hillers and the like, and particularly to an improved disc support for disc hillers and similar machines.

A disc hiller is a relatively widely used piece of farm equipment and is employed for the purpose of hilling up the ground for certain crops where this is a desirable operation.

Heretofore most disc hillers have employed discs mounted on plain bearings, and this has led to exceedingly rapid wear of the bearings because the soil in which a hiller operates is necessarily rather fine, and many times is also dry and sandy.

In discs hillers according to prior practices, a common arrangement for the supporting member for the disc was on the concave side of the disk, and this placed the member and the supporting axle for the disc in a position where it was directly exposed to the earth being worked and also required the use of a larger disc than was always necessary in order to make certain that the axle and supporting member were up above the level of the hill being formed.

The present invention has as its particular object the provision of a disc hiller arrangement which overcomes the difficulties referred to above.

A particular object of this invention is the provision of a disc support in a disc hiller on which the disc is supported on antifriction bearings and therefore turns quite readily.

Another particular object is the provision of a journal arrangement for a disc for a disc hiller so that the journals are protected at all times against dust and sand.

A still further object is the provision of a supporting arrangement of a disc for a disc hiller such that the entire concave surface of the disc is available as a working space.

It is also an object to provide a disc hiller having the discs supported in such a manner that they can be operated as close together as desired or as far apart as desired, thereby giving the implement a high degree of flexibility and utility.

These and other objects and advantages will become more apparent upon reference to the following description taken in connection with the accompanying drawings, in which:

Figure 1 is a fragmentary view of an implement having a disc hilling attachment according to my invention; and Figure 2 is a vertical section taken through one of the hilling discs showing the construction of the axle and journal for the disc in accordance with the teachings of my invention.

Referring to the drawings somewhat more in detail, there is shown in Figure 1 a disc hilling attachment comprising the spaced discs 10 which are arranged with their concave sides toward each other and are inclined at angles so that movement of the implement in the direction of the arrow 12 will cause the discs to throw the soil up into a hill.

Each disc is mounted on the lower end of a support bar 14 having a lower bent-in end 16 that rotatably supports a tube 18. Tube 18 has a flanged sleeve 20 on the end thereof that engages the convex side of the disc and which is connected with the disc, as by the bolts 22.

Each support bar is adjustably clamped to a beam 24, as by clamps 26, so the discs can be adjusted vertically and transversely on the beam to bring them into any desired relationship relative to each other and to the soil being worked.

Beam 24 may be supported in any suitable manner on an implement frame, such as the member 28, which may be a portion of a tractor, plow, cultivator, or other suitable conveying instrumentality.

The particular construction of the disc support is better illustrated in Figure 2, wherein it will be seen that the turned over end part 16 of an L-shaped support bar 14 is turned down, as at 30, 32, to provide an axle that extends into tube 18. Tube 18 intermediate its ends has a rolled-in ridge portion 34 that serves as an abutment for outer races 36 of spaced anti-friction bearings 38. Anti-friction bearings 38 have inner races 40, one of which bears against the shoulder between parts 30 and 32 of the axle, and the other of which is engaged by nut 42 on the end of the axle.

It will be evident that the arrangement positively holds tube 18 and bent-up part 16 of support bar 14 in fixed relation while permitting free rotation of the said tube on the axle.

The end of the tube 18 adjacent the end of the axle has fitted thereover the flanged sleeve 20, and which is preferably retained rigidly in position on the tube by welding, as at 44. A closure plate 46 is mounted within sleeve 20 and against the end of tube 18, and is retained in position by snap ring 48. Plate 46, it will be evident, closes the right end of tube 18, thereby preventing any dust, sand, grit, or other foreign matter from getting into the tube and harming the bearings 38.

At the opposite end of tube 18 there is a grease retaining member 50 including packing 52 which bears on part 30 of the axle and thus provides a tight seal at that end of the said tube. A lubrication fitting, as indicated at 54, is preferably provided in plate 46 so that lubricant can be introduced into the right end of tube 18 for lubricating the bearings 38.

It will be noted that the lubrication fitting in no way destroys the seal at the right end of the tube, and any lubricant, such as grease, introduced into tube 18 through the said fitting will tend not only to lubricate the bearings, but also to provide a positively dust excluding seal about the periphery of plate 46 and between part 30 of the axle and the packing 52.

If desired, there may be a plate 56 mounted between the left-hand inner race member 40 and the shoulder between parts 30 and 32 of the axle to provide a baffle between the bearings and the left end of tube 18. The provision of this plate further insures that absolutely no dust, sand, or grit will gain access to the interior of tube 18 in the space occupied by the bearings.

Due to the fact that the axles and support bars for the disc lie wholly on the convex sides thereof, the disc supports are as remote from the soil being worked, and therefore from the dust and sand that is stirred up into the atmosphere as it is possible to get them.

Also, by placing the support bar and bearings for the discs on the convex sides thereof, the discs can be moved as close together as desired without any interference from the said supports. It will be evident that the entire areas of the concave faces of the discs can be employed in a hilling operation, and that accordingly a disc hiller having disc supports according to my invention on the convex sides of the disc has greater utility because hills of substantially any size can be thrown up without any interference whatsoever from the hubs, support axles, and support bars of the discs.

It will be understood that this invention is susceptible to modification in order to adapt it to different usages and conditions, and, accordingly, it is desired to comprehend such modifications within this invention as may fall within the scope of the appended claims.

I claim:

1. In a disc hilling machine, a disc having front and rear sides, means for supporting said disc on said machine comprising a bar attached to said machine, said bar having a bent-in portion forming an axle, said axle having a shoulder and a reduced diameter portion, a tubular housing rotatably fitted on said axle, a flanged sleeve attached to the rear side of said disc and to the end of said tubular housing remote from said bar whereby said housing extends away from the rear side of said disc only, means for closing the opposite ends of said tubular housing to prevent foreign matter from entering the housing, said means at the end of the tubular housing adjacent said disc comprising a closure plate disposed within said sleeve abutting the end of said housing and a snap ring for retaining said closure plate, means in said closure plate for lubricating the interior of said housing, the outer portion of said closure plate being covered by said disc and an opening in said disc for access to said lubricating means.

2. In a disc hilling machine, a concave disc, a support bar attached to the machine and extending downwardly therefrom, a generally horizontal axle portion on said bar at the lower end projecting toward the center of said disc, said axle portion having a reduced diameter portion and a shoulder, a tubular housing surrounding said axle and having flange means extending radially outwardly of said housing and abutting the bar side of the disc, means detachably connecting said disc with said flange means, spaced axial thrust sustaining anti-friction bearings surrounding said shaft within said housing and fixed in position on the shaft and inside the housing thereby to support said housing and disc for free rotation on said axle while sustaining axial thrusts imposed on said disc in both directions, flexible seal means between said housing and axle adjacent the bar to exclude foreign matter from inside the housing, and a closure plate inside the disc end of said housing sealing the said end of the housing against the ingress of foreign matter, means carried by said closure plate for admitting lubricant to the interior of said housing, the outer portion of said closure plate being covered by said disc and an opening in said disc for access to said lubricant means, and said disc being detachable from said housing without disturbing said closure plate.

References Cited in the file of this patent

UNITED STATES PATENTS

| | | |
|---|---|---|
| 657,204 | Poole | Sept. 4, 1900 |
| 951,005 | Kiefer | Mar. 1, 1910 |
| 962,629 | Fowle | June 28, 1910 |
| 1,697,784 | Seaholm | Jan. 1, 1929 |
| 1,801,036 | Cole | Apr. 14, 1931 |
| 1,818,656 | Taylor et al. | Aug. 11, 1931 |
| 1,917,674 | Weaver | July13, 1933 |
| 1,981,393 | Severtson | Nov. 20, 1934 |
| 2,108,351 | Silver | Feb. 15, 1938 |
| 2,234,822 | Forsberg | Mar. 11, 1941 |
| 2,240,994 | Love | May 6, 1941 |
| 2,277,979 | Horger | Mar. 31, 1942 |
| 2,457,151 | Hester | Dec. 28, 1948 |
| 2,546,461 | Lewis | Mar. 27, 1951 |
| 2,560,965 | Lewis | July 17, 1951 |